(12) United States Patent
Nagao et al.

(10) Patent No.: US 8,359,413 B2
(45) Date of Patent: Jan. 22, 2013

(54) DATA STREAM BUFFER CONTROL USING REFERENCE TIME AND DECODING TIME

(75) Inventors: Shinichi Nagao, Tokyo (JP); Takahiro Hosoi, Saitama (JP); Nobutoshi Shida, Tokyo (JP)

(73) Assignee: Sony Corporation, Tokyo (JP)

( * ) Notice: Subject to any disclaimer, the term of this patent is extended or adjusted under 35 U.S.C. 154(b) by 86 days.

(21) Appl. No.: 12/706,126

(22) Filed: Feb. 16, 2010

(65) Prior Publication Data

US 2010/0211706 A1    Aug. 19, 2010

(30) Foreign Application Priority Data

Feb. 16, 2009    (JP) ................... 2009-032129

(51) Int. Cl.
*G06F 3/00*     (2006.01)
*G06F 15/16*    (2006.01)

(52) U.S. Cl. .......................... 710/52; 709/231
(58) Field of Classification Search ............. 710/52; 709/231
See application file for complete search history.

(56) References Cited

U.S. PATENT DOCUMENTS

| 7,421,129 B2 * | 9/2008 | Lee et al. ................... 382/232 |
| 2006/0250284 A1 * | 11/2006 | Lee ................................... 341/51 |
| 2010/0274918 A1 * | 10/2010 | Mimata et al. ............... 709/231 |

FOREIGN PATENT DOCUMENTS

| JP | 2005-167414 A | 6/2005 |
| JP | 2006-041839 A | 2/2006 |
| JP | 2007-295421 A | 11/2007 |
| JP | 2008-102974 A | 5/2008 |

* cited by examiner

*Primary Examiner* — Hyun Nam
(74) *Attorney, Agent, or Firm* — Wolf, Greenfield & Sacks, P.C.

(57) ABSTRACT

A buffer control device includes a reference time generation unit configured to generate a reference time based on time information included in a data stream input, a buffer configured to receive an encoded data extracted from the data stream, store the encoded data, and output the encoded data at a decoding time or a reproducing time of the encoded data, and a control unit configured to control an input of the encoded data to the buffer based on a relativity between the decoding time or the reproducing time of the encoded data and the reference time.

9 Claims, 11 Drawing Sheets

DATA STREAM BUFFER CONTROL USING REFERENCE TIME AND DECODING TIME

BACKGROUND OF THE INVENTION

1. Field of the Invention

The present invention relates to a buffer control device, and specifically to a buffer control device configured to control a buffer that stores encoded data, a processing method for the same, and a program that causes a computer to execute the method.

2. Description of the Related Art

As the size of contents data increases, a technology for encoding data has been widely used to compress and encrypt the data. For example, as a standard for compressing data such as video data and audio data, encoding data in Moving Picture Experts Group 2 (MPEG-2) format has been developed. Specifically, for example, a recording medium such as a digital versatile disc (DVD) stores a program stream (PS) multiplexed with video and audio data encoded in the MPEG-2 format. As for digital broadcasting, for example, video and audio data encoded in the MPEG-2 format are multiplexed in units of packet, and a successive stream of the packets (transport stream (TS)) is transmitted.

A reproduction device that reproduces the video and audio data included in the stream demultiplexes the encoded video and audio data in the stream individually at first. The reproduction device then decodes each piece of the demultiplexed video and audio data and reproduces the data. At the time of decoding and reproducing, the reproduction device temporarily stores the encoded video and audio data in a buffer. When time clocked by the reproduction device becomes equal to a decoding time or a reproducing time of the video and audio data, the reproduction device reads the encoded video and audio data from the buffer and decodes or reproduces the data. In this manner, the reproduction device outputs the video data and the audio data in synchronization with each other.

If, for example, a user inputs an instruction to switch an audio output (for example, from Japanese language to English language) to the reproduction device, the reproduction device discards an encoded audio signal stored in the buffer and stores an audio signal specified by the instruction in the buffer. The buffer stores more than a predetermined amount of audio signals to prevent an underflow, and there can be a silent period during which the more than the predetermined amount of audio signals discarded in response to the instruction to switch the audio output are not reproduced. It is also disadvantageous that, when a low bit rate codec is used, the silent period is longer than the case of using a high bit rate codec, even if the same amount of the audio signals are discarded.

In order to prevent such a silent period that may be caused when the audio output is switched, there is a proposed television receiver that stores audio signals in a buffer. For example, the proposed television receiver stores audio signals that are not reproduced in a buffer, and outputs the audio signals stored in the buffer upon instruction to switch the audio output so as not to cause the silent period (see Japanese Unexamined Patent Application Publication No. 2006-41839 (FIG. 1)).

SUMMARY OF THE INVENTION

However, there is a disadvantage with the above related art that an additional buffer is used for storing the audio signals that are not output.

It is desirable to limit the silent period within a predetermined period of time without using an additional buffer to store the audio signals in preparation for switching an audio output.

According to an embodiment of the present invention, there are provided a buffer control device including a reference time generation unit configured to generate a reference time based on time information included in a data stream input, a buffer configured to receive an encoded data extracted from the data stream, store the encoded data, and output the encoded data at a decoding time or a reproducing time of the encoded data, and a control unit configured to control an input of the encoded data to the buffer based on a relativity between the decoding time or the reproducing time of the encoded data and the reference time, as well as a processing method employed by the buffer control device and a program that causes a computer to execute the processing method. In this manner, the reference time can be generated based on the time information included in the data stream, and the input of the encoded data to the buffer can be controlled based on the relativity between the decoding time or the reproducing time of the encoded data and the reference time.

Furthermore, according to the embodiment, the control unit may be configured to calculate a difference between the decoding time or the reproducing time of the encoded data and the reference time, and stop the input to the buffer when the difference is larger than a predetermined threshold. In this manner, the difference between the decoding time or the reproducing time of the encoded data and the reference time can be calculated, and the input to the buffer can be stopped when the difference is larger than the predetermined threshold.

Moreover, according to the embodiment, the control unit may be configured to obtain the reference time from the reference time generation unit at a predetermined time interval after stopping the input to the buffer, and resume the input to the buffer when the difference between the reference time and the decoding time or the reproducing time is equal to or smaller than the predetermined threshold. In this manner, the reference time can be obtained from the reference time generation unit at the predetermined time interval after stopping the input to the buffer, and the input to the buffer can be resumed when the difference between the reference time and the decoding time or the reproducing time is equal to or smaller than the predetermined threshold.

Furthermore, according to the embodiment, the control unit may be configured to obtain an amount of the encoded data stored in the buffer, and stop the input to the buffer when the amount is larger than a predetermined amount. In this manner, the input to the buffer can be stopped when the amount of the encoded data is larger than a predetermined amount.

Moreover, according to the embodiment, the control unit may be configured to obtain the amount of the encoded data stored in the buffer again after stopping the input to the buffer, and resume the input to the buffer when the amount is equal to or smaller than the predetermined amount. In this manner, when the input to the buffer is stopped, the amount of the encoded data stored in the buffer can be obtained again, and the input to the buffer can be resumed when the amount is equal to or smaller than the predetermined amount.

Furthermore, according to the embodiment, the encoded data may be data encoded in the MPEG format. In this manner, the encoded data can be encoded in the MPEG format.

Moreover, according to the embodiment, the decoding time may be a decoding time stamp (DTS) in the MPEG format, and the reproducing time may be a presentation time stamp (PTS) in the MPEG format. In this manner, the decoding time can be the DTS in the MPEG format, and the reproducing time can be the PTS in the MPEG format.

Furthermore, according to the embodiment, the time information may be either a program clock reference (PCR) or a system clock reference (SCR) in the MPEG format. In this manner, the time information can be either the PCR or the SCR in the MPEG format.

According to the embodiment of the present invention, the silent period can be advantageously limited within a predetermined period of time without using an additional buffer to store the audio signals in preparation for switching an audio output.

DESCRIPTION OF THE PREFERRED EMBODIMENTS

A best mode for carrying out the present invention (referred to below as an embodiment) is described below in the following order.

1. Embodiment of the present invention (buffer control: example of controlling an input of a packetized elementary stream (PES) to a buffer)

2. Modifications (example of using a transport stream (TS) as a data stream, example of extracting a presentation time stamp (PTS))

<1. Embodiment of the Present Invention>
[Example of Internal Configuration of Record Reproduction Device]

Figure 1:
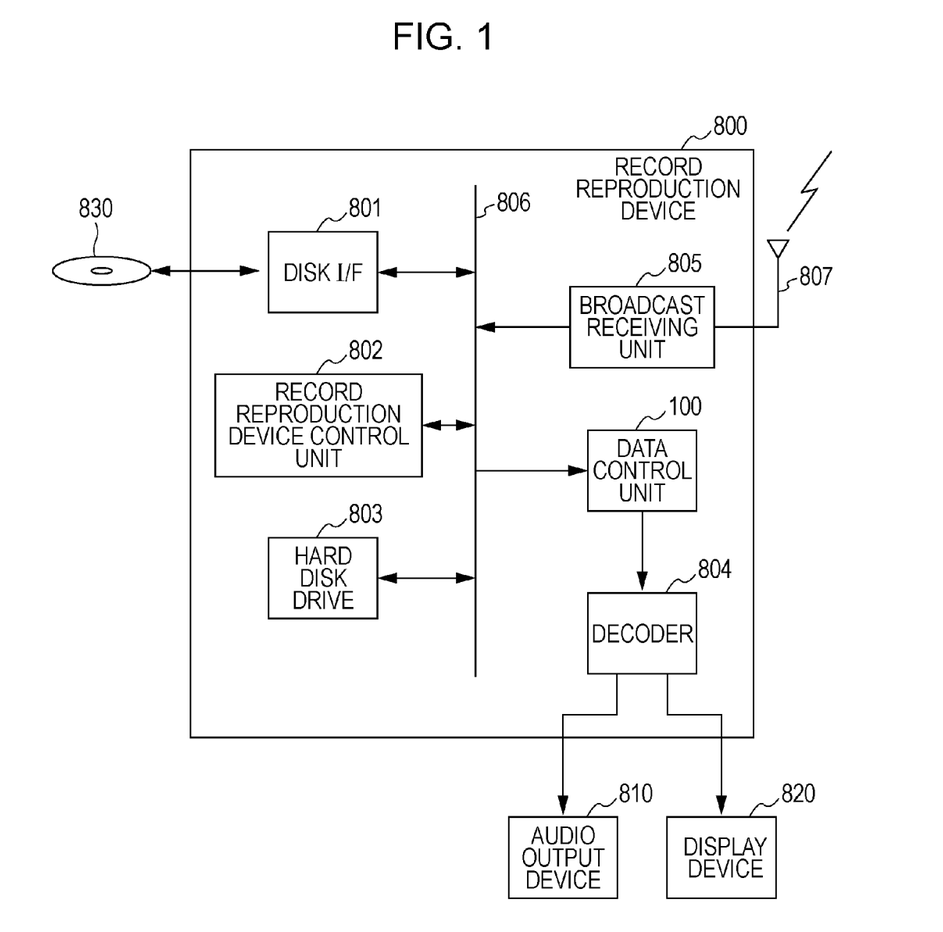
FIG. 1 is a block diagram of an exemplary configuration of a record reproduction device according to an embodiment of the present invention.

FIG. 1 is a block diagram of an exemplary configuration of a record reproduction device 800 according to an embodiment of the present invention. The record reproduction device 800 includes a data control unit 100, a disk interface (I/F) 801, a record reproduction device control unit 802, a hard disk drive 803, a decoder 804, and a broadcast receiving unit 805. These constituents are connected to one another via a bus 806.

The disk I/F 801 reads information from a recording medium such as a digital versatile disk (DVD), or writes the information on the recording medium. For example, the disk I/F 801 reads a program stream (PS) stored in a DVD 830 in the Moving Picture Experts Group (MPEG) format, and outputs the PS to the data control unit 100.

The record reproduction device control unit 802 includes a central processing unit (CPU), and controls an operation of the entire record reproduction device 800.

The broadcast receiving unit 805 receives the TS transmitted in the MPEG format for digital broadcasting or the like via an antenna 807. The broadcast receiving unit 805 stores the received TS in the hard disk drive 803 or outputs the TS to the data control unit 100.

The hard disk drive 803 is a storage device that magnetically reads and writes data. For example, the hard disk drive 803 stores the TS output from the broadcast receiving unit 805.

The data control unit 100 receives a data stream such as the PS and the TS in the MPEG format, demultiplexes encoded audio and video data multiplexed with the data stream, and outputs the demultiplexed encoded data to the decoder 804. An exemplary functional configuration realized by the data control unit 100 will be described in detail with reference to FIG. 2.

The decoder 804 decodes the encoded data output from the data control unit 100, and outputs the decoded data to an audio output device 810 or a display device 820 depending on the type of the encoded data. The audio output device 810 reproduces the decoded audio data to output the audio data. The display device 820 reproduces the decoded data of a video and a caption to display the video and the caption on a screen.

[Exemplary Functional Configuration of Data Control Unit]

Figure 2:
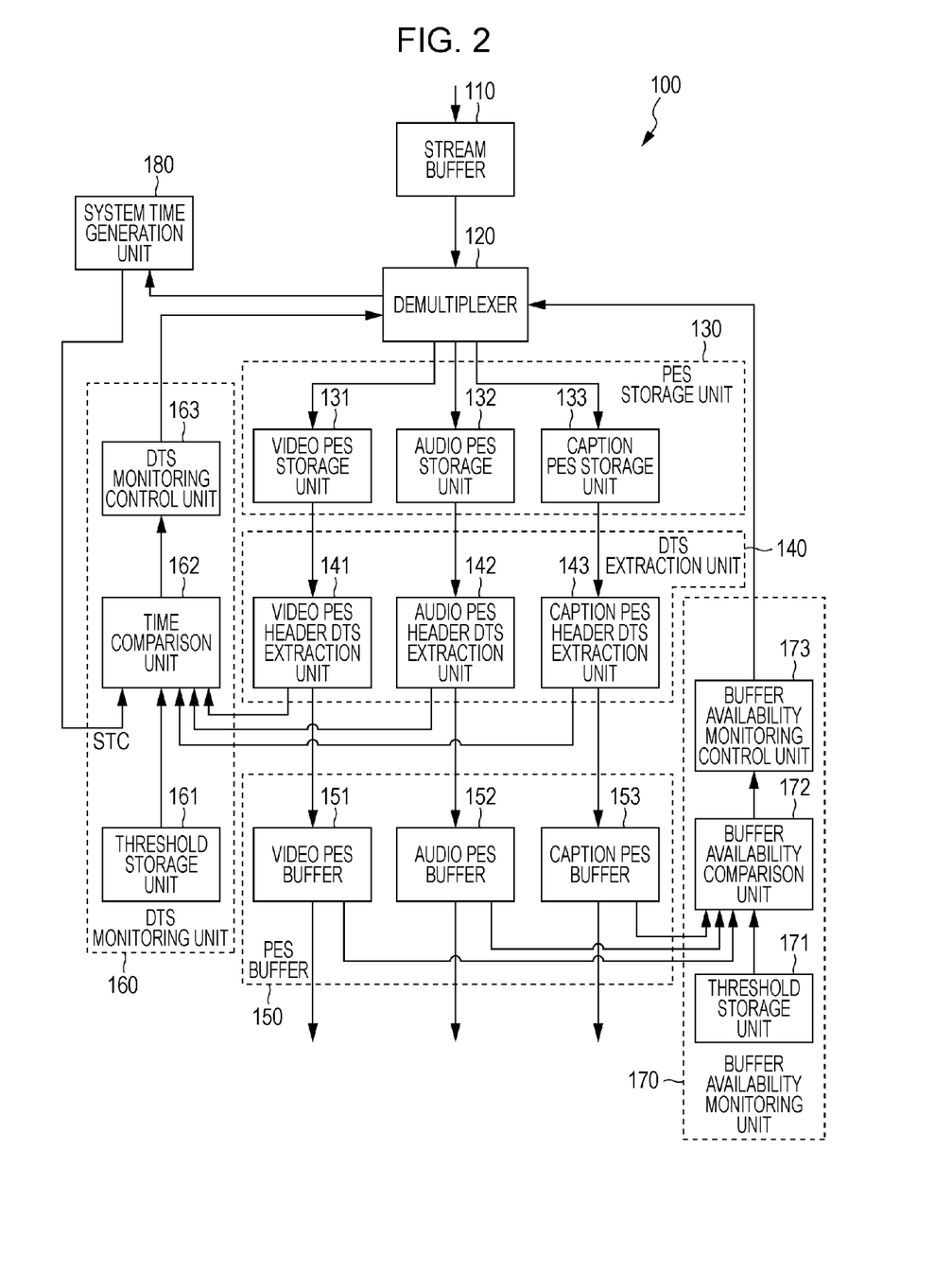
FIG. 2 is a block diagram of an exemplary functional configuration of a data control unit according to the embodiment of the present invention.

FIG. 2 is a block diagram of an exemplary functional configuration of the data control unit 100 according to the embodiment of the present invention. The data control unit 100 includes a stream buffer 110, a demultiplexer 120, a PES storage unit 130, a DTS extraction unit 140, a PES buffer 150, a decoding time stamp (DTS) monitoring unit 160, a buffer availability monitoring unit 170, and a system time generation unit 180. An explanation of the present embodiment will be given with an example of inputting the PS in the MPEG format to the data control unit 100 as the data stream.

The stream buffer 110 inputs the PS in the MPEG format via the bus 806, and stores the PS. The PS stored in the stream buffer 110 is read by the demultiplexer 120 at appropriate times.

The demultiplexer 120 reads the PS in the MPEG format stored in the stream buffer 110, and demultiplexes the PES multiplexed with the PS. The demultiplexer 120 outputs the demultiplexed video PES, audio PES, caption PES, and the like to the PES storage unit 130.

The demultiplexer 120 also extracts a system clock reference (SCR) included in the PS, and outputs the SCR to the system time generation unit 180. The SCR includes time information for setting a system time clock (STC) as a reference to a decoding time for the encoded data or a reproducing time for the decoded data.

The PES storage unit 130 includes a video PES storage unit 131, an audio PES storage unit 132, and a caption PES storage unit 133, and stores various types of the PES output from the demultiplexer 120. For example, the video PES storage unit 131 stores the video PES demultiplexed by the demultiplexer 120. The audio PES storage unit 132 stores the audio PES demultiplexed by the demultiplexer 120. The caption PES storage unit 133 stores the caption PES demultiplexed by the demultiplexer 120. The PES stored in the PES storage unit 130 is read by the DTS extraction unit 140 at appropriate times.

The DTS extraction unit 140 extracts the DTS included in a PES header of the PES read from the PES storage unit 130, and outputs the extracted DTS to a time comparison unit 162. For example, a video PES header DTS extraction unit 141 extracts the DTS included in the video PES read from the video PES storage unit 131, and outputs the extracted DTS to the time comparison unit 162. Furthermore, for example, an audio PES header DTS extraction unit 142 extracts the DTS included in the audio PES read from the audio PES storage unit 132, and outputs the extracted DTS to the time comparison unit 162. Moreover, for example, a caption PES header DTS extraction unit 143 extracts the DTS included in the caption PES read from the caption PES storage unit 133, and outputs the extracted DTS to the time comparison unit 162.

The PES buffer 150 stores the PES output from the DTS extraction unit 140. For example, a video PES buffer 151 stores the video PES output from the video PES header DTS extraction unit 141. Furthermore, for example, an audio PES buffer 152 stores the audio PES output from the audio PES header DTS extraction unit 142. Moreover, for example, a caption PES buffer 153 stores the caption PES output from the caption PES header DTS extraction unit 143. The PES buffer 150 is an example of a buffer according to an embodiment of the present invention.

The DTS monitoring unit 160 controls demultiplex of each PES performed by the demultiplexer 120 based on the relativity between the DTS extracted by the DTS extraction unit 140 and the STC generated by the system time generation unit 180. The DTS monitoring unit 160 includes a threshold storage unit 161, the time comparison unit 162, and a DTS monitoring control unit 163. The threshold storage unit 161 stores a threshold read by the time comparison unit 162. The time comparison unit 162 calculates a difference between the DTS and the STC, and determines whether the difference is equal to or larger than the threshold read from the threshold storage unit 161. The DTS monitoring control unit 163 stops a demultiplexing of each PES performed by the demultiplexer 120, when the time comparison unit 162 determines that the calculated difference is equal to or larger than the threshold.

The time comparison unit 162 calculates the difference between the DTS extracted by the DTS extraction unit 140 and the STC generated by the system time generation unit 180, and determines whether the difference is equal to or larger than the threshold stored in the threshold storage unit 161. If the calculated difference is equal to or larger than the threshold, the DTS monitoring control unit 163 outputs an operation stop command to the demultiplexer 120. In response to the operation stop command, the demultiplexer 120 stops reading the PS from the stream buffer 110. After stopping the operation of the demultiplexer 120, the time comparison unit 162 obtains an STC from the system time generation unit 180 again. The time comparison unit 162 then calculates a difference between the newly obtained STC and the DTS already obtained, and determines whether the difference is equal to or larger than the threshold. If the difference is smaller than the threshold, the DTS monitoring control unit 163 outputs an operation start command to the demultiplexer 120. In response to the operation start command, the demultiplexer 120 resumes reading the PS from the stream buffer 110. The PES from which the DTS was extracted is then output to the PES buffer 150. After the operation of the demultiplexer 120 stops, the time comparison unit 162 keeps obtaining a new STC from the system time generation unit 180 at a predetermined interval until the difference between the DTS and a newly obtained STC becomes smaller than the threshold. The DTS monitoring control unit 163 is an example of a control unit according to an embodiment of the present invention.

The buffer availability monitoring unit 170 obtains an amount of PES data stored in the PES buffer 150, and controls the demultiplex process of each PES performed by the demultiplexer 120 based on the amount of the data. The buffer availability monitoring unit 170 includes a threshold storage unit 171, a buffer availability comparison unit 172, and a buffer availability monitoring control unit 173. The threshold storage unit 171 stores a threshold read by the buffer availability comparison unit 172. The buffer availability comparison unit 172 obtains an amount of each PES data stored in the PES buffer 150, and determines whether the amount of the data is equal to or larger than the threshold read from the threshold storage unit 171. The buffer availability monitoring control unit 173 stops a demultiplexing of each PES performed by the demultiplexer 120, when the buffer availability comparison unit 172 determines that the amount of the obtained PES data is equal to or larger than the threshold.

The buffer availability comparison unit 172 obtains the amount of the PES data stored in the PES buffer 150, and determines whether the amount is equal to or larger than the threshold stored in the threshold storage unit 171. If the amount of the PES data is equal to or larger than the threshold, the buffer availability monitoring control unit 173 outputs an operation stop command to the demultiplexer 120. In response to the operation stop command, the demultiplexer 120 stops reading the PS from the stream buffer 110. After stopping the operation of the demultiplexer 120, the buffer availability comparison unit 172 obtains an amount of a PES data from the PES buffer 150 again. The buffer availability comparison unit 172 then determines whether the newly obtained amount of the PES data is equal to or larger than the threshold. If the newly obtained amount of the PES data is smaller than the threshold, the buffer availability comparison unit 172 outputs an operation start command to the demultiplexer 120. In response to the operation start command, the demultiplexer 120 resumes reading the PS from the stream buffer 110. After the operation of the demultiplexer 120 stops, the buffer availability comparison unit 172 keeps obtaining a new amount of the PES data from the PES buffer 150 at a predetermined interval until the amount of the PES data becomes smaller than the threshold. The amount of the PES data decreases as time passes because the PES stored in the PES buffer 150 is read by the decoder 804. The buffer availability monitoring control unit 173 is an example of the control unit according to an embodiment of the present invention.

The system time generation unit 180 generates the STC that serves as a reference time based on the SCR output from the demultiplexer 120. The system time generation unit 180 outputs the STC to the time comparison unit 162. The system time generation unit 180 is an example of a reference time generation unit according to an embodiment of the present invention.

[Data Structure of PS]

Figure 3A:
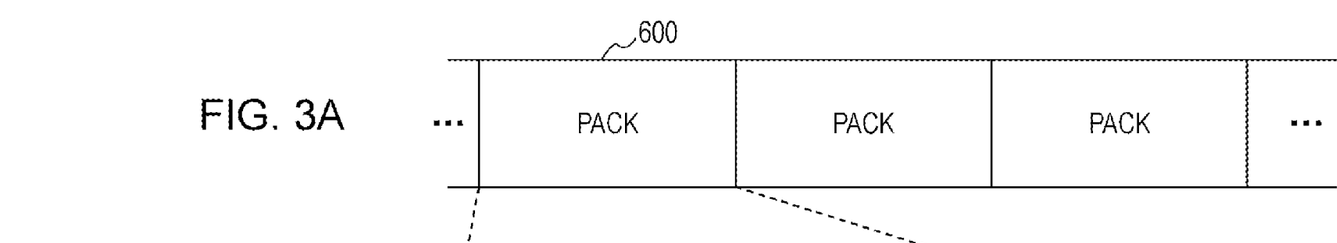
FIGS. 3A to 3C illustrate a data structure of the PS in the MPEG format input to a stream buffer according to the embodiment of the present invention.
Figure 3B:
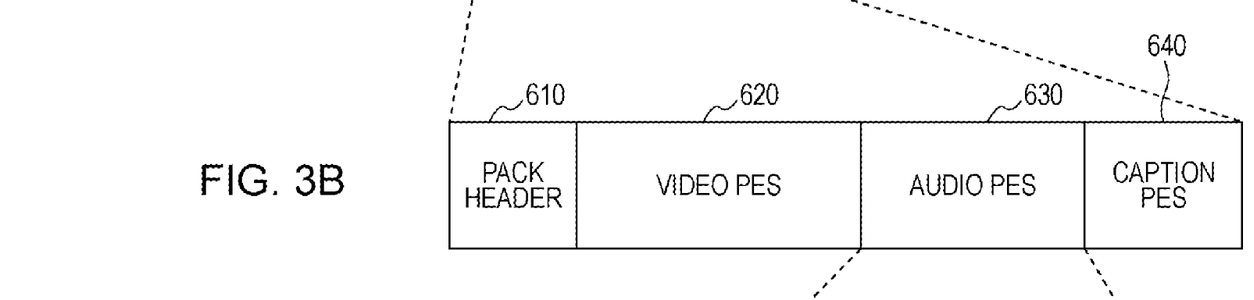
Figure 3C:
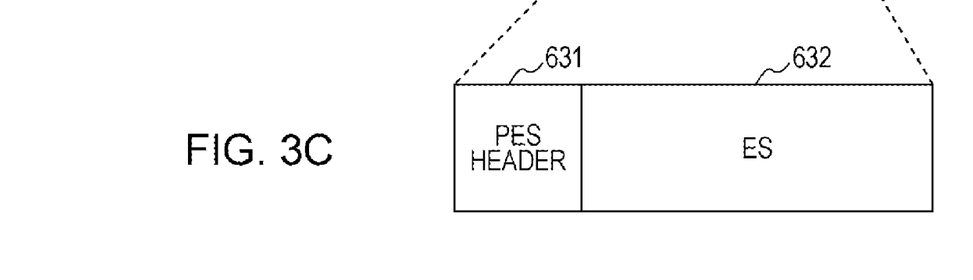

FIGS. 3A to 3C illustrate a data structure of the PS in the MPEG format input to the stream buffer 110 according to the embodiment of the present invention.

As shown in FIG. 3A, the PS is formed by a group of packs 600. Each pack 600 includes, for example, as shown in FIG. 3B, a pack header 610, a video PES 620, an audio PES 630, and a caption PES 640. Each PES includes, for example, as shown in FIG. 3C, a PES header 631 and an elementary stream (ES) 632. The ES corresponds to the encoded data.

Figure 4A:
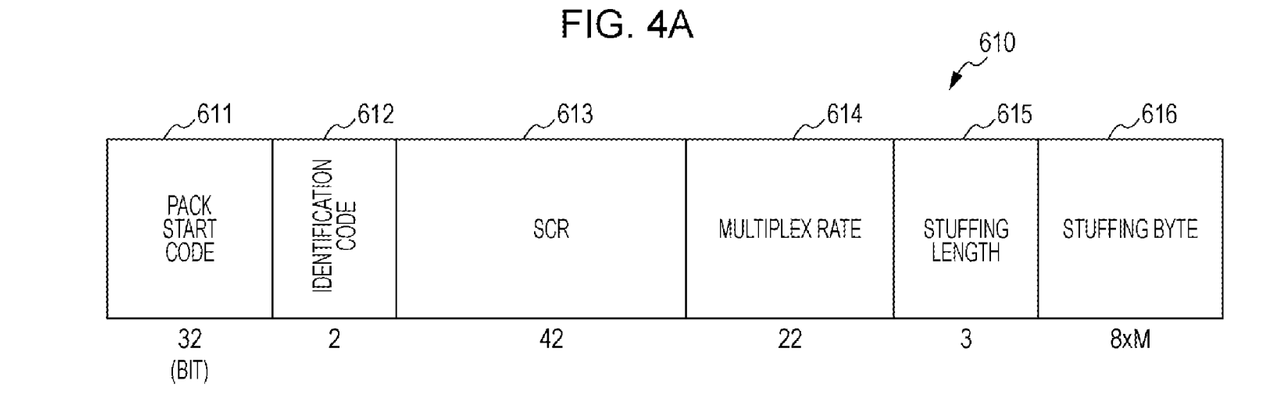
FIGS. 4A and 4B illustrate data structures of a pack header and a packetized elementary stream (PES) header, respectively.
Figure 4B:
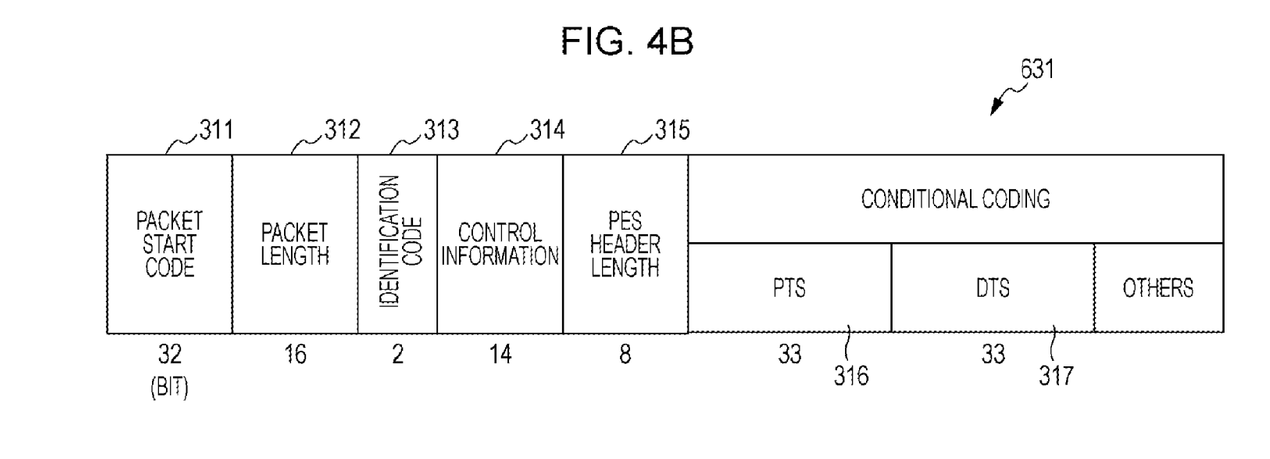

FIGS. 4A and 4B illustrate data structures of the pack header and the PES header, respectively. FIG. 4A shows the structure of the pack header 610 shown in FIG. 3B, and FIG. 4B shows the structure of the PES header 631 shown in FIG. 3C.

A pack start code 611 shown in FIG. 4A includes a start code indicative of a pack header. An identification code 612 is used to identify an MPEG2 data, and includes 01. An SCR 613 expresses the current time of the stream based on a 90 kHz clock in 33-bit data. In addition to the 33-bit data, a 27 MHz clock is expressed in 9-bit data. The system time generation unit 180 sets the STC to a value indicated by the SCR 613. A multiplex rate 614 is a rate of the PS expressed in units of 50 bytes per second. A stuffing length 615 indicates a data length for adjusting the length. A stuffing byte 616 includes a stuffing.

The PES header 631 shown in FIG. 4B includes a packet start code 311 indicative of start of a packet, a packet length 312, an identification code 313, a control information 314, a PES header length 315, a presentation time stamp (PTS) 316, and a DTS 317. The PTS 316 includes a 33-bit long PTS based on the 90 kHz clock indicative of the time to reproduce the ES (reproducing time). The DTS 317 includes a 33-bit long DTS based on the 90 kHz clock indicative of the time to decode the ES (decoding time).

[Example of Inputting/Outputting PES Data to/from PES Buffer]

Figure 5:
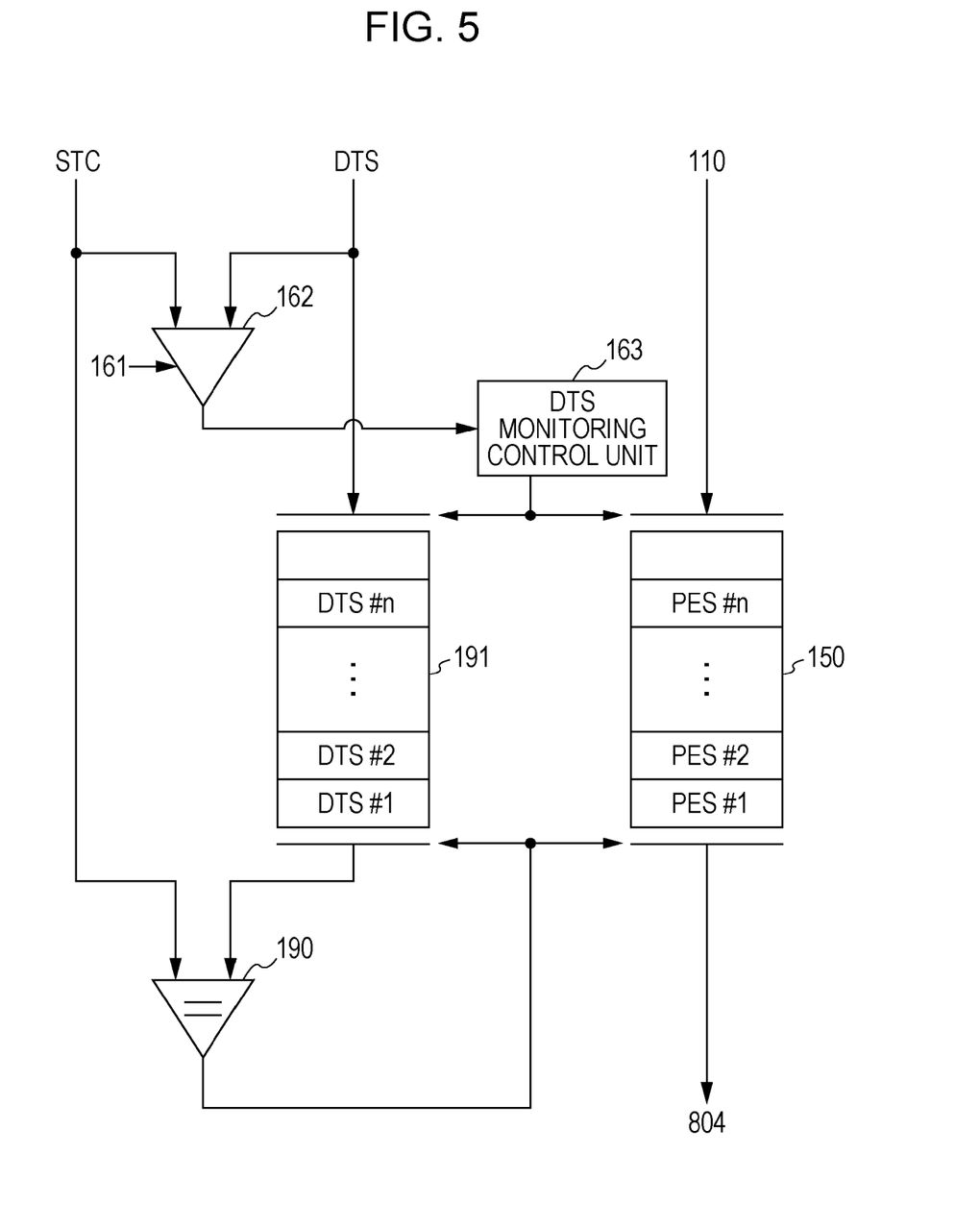
FIG. 5 illustrates an example of how the PES is input to and output from a PES buffer according to the embodiment of the present invention.

FIG. 5 illustrates an example of how the PES is input to and output from the PES buffer 150 according to the embodiment of the present invention. In this example, the PES output from the demultiplexer 120 is stored in the PES buffer 150 and output to the decoder 804.

First, when the PES is output from the demultiplexer 120, the DTS included in the PES is extracted by the DTS extraction unit 140. The DTS is then input to the time comparison unit 162, and the time comparison unit 162 obtains the STC from the system time generation unit 180. The time comparison unit 162 calculates the difference between the DTS and the STC, and determines whether the calculated difference is equal to or larger than the threshold stored in the threshold storage unit 161. The threshold stored in the threshold storage unit 161 indicates a time difference, which corresponds to, for example, one second.

If the calculated difference is smaller than the threshold, the PES output from the demultiplexer 120 is stored in the PES buffer 150, and the DTS corresponding to this PES is stored in a DTS storage unit 191. On the other hand, if the calculated difference is equal to or larger than the threshold, the DTS monitoring control unit 163 stops the operation of the demultiplexer 120. The PES from which the DTS was extracted is stored in the PES storage unit 130 so as not to be input to the PES buffer 150. The DTS monitoring control unit 163 prevents the DTS corresponding to the PES subject to determination from being input to the DTS storage unit 191.

In the example shown in FIG. 5, the PES buffer 150 stores n pieces of PES from PES #1 to PES #n sequentially in ascending order. Similarly, the DTS storage unit 191 stores n pieces of DTS from DTS #1 to DTS #n sequentially in ascending order. The PES buffer 150 and the DTS storage unit 191 operate on a first-in first-out (FIFO) basis, in which what was input first is output first. The DTS included in the PES is applied with the same number as the corresponding PES in FIG. 5, which indicates the relation between each PES and its corresponding DTS.

Explained below is how the PES is output from the PES buffer 150. An output time determining unit 190 reads the DTS stored in the DTS storage unit 191 at a predetermined time interval, and obtains the STC from the system time generation unit 180. The output time determining unit 190 then determines whether the DTS matches the STC. If the DTS matches the STC, a PES that includes the DTS is output to the decoder 804. If the DTS does not match the STC, the output time determining unit 190 obtains the STC from the system time generation unit 180 again after the predetermined time interval. The output time determining unit 190 determines whether the previously read out DTS matches the newly obtained STC, thus makes a determination on each DTS stored in the DTS storage unit 191.

For example, in the example shown in FIG. 5, the output time determining unit 190 determines whether the DTS denoted by DTS #1 matches the STC. If the DTS matches the STC here, PES #1 is output to the decoder 804. In this manner, the output time determining unit 190 makes a determination in the order starting from the DTS stored at the top of the DTS storage unit 191.

[Example of Demultiplex Process Control Performed by DTS Monitoring Unit]

Figure 6:
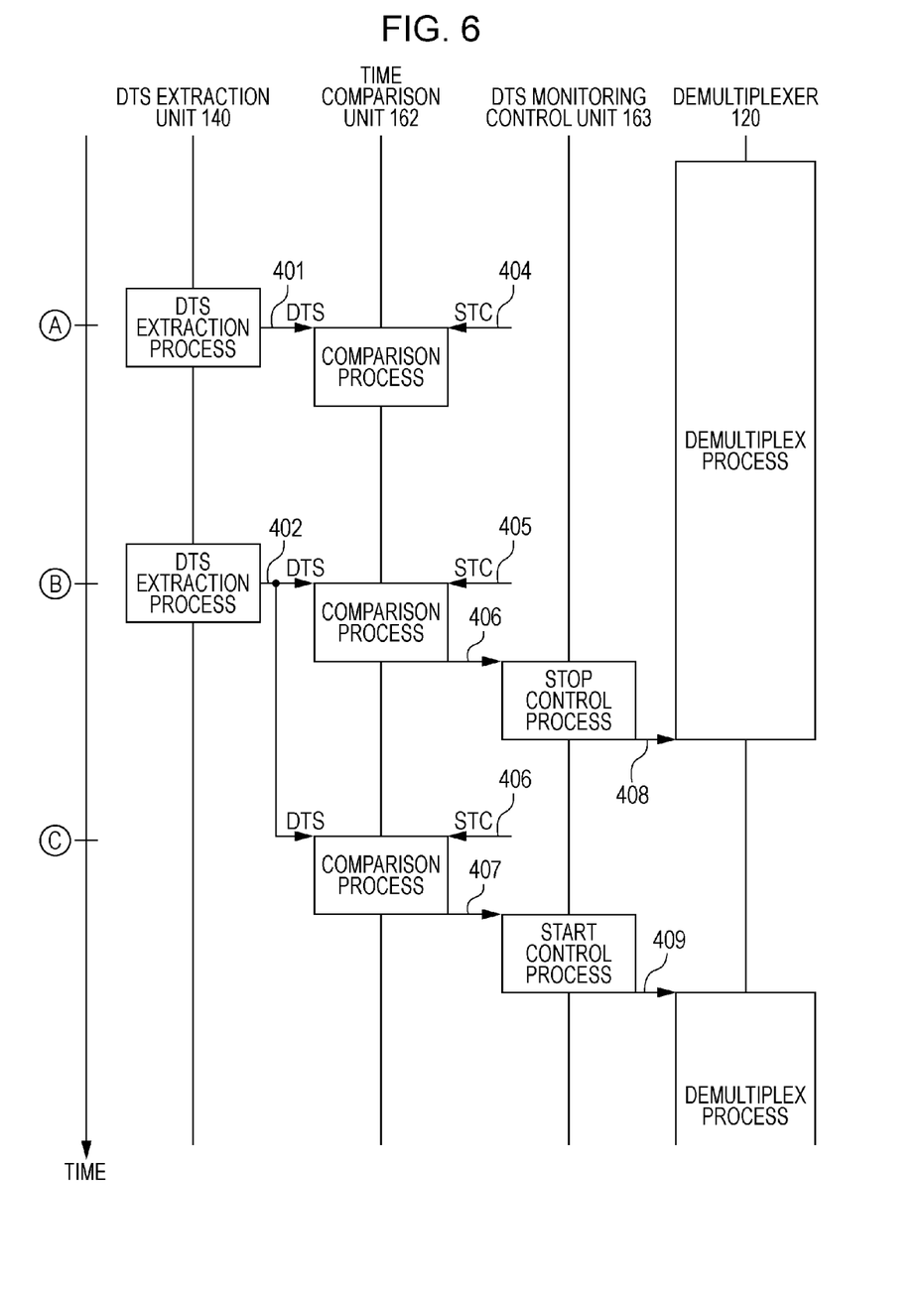
FIG. 6 is a sequence diagram for illustrating an example of a demultiplex process control performed by a decoding time stamp (DTS) monitoring unit according to the embodiment of the present invention.

FIG. 6 is a sequence diagram for illustrating an example of a demultiplex process control performed by the DTS monitoring unit 160 according to the embodiment of the present invention.

When the DTS extracted by the DTS extraction unit 140 is output to the time comparison unit 162 (401), the time comparison unit 162 obtains the STC from the system time generation unit 180 at a time point A shown in FIG. 6 (404). The time comparison unit 162 then calculates the difference between the DTS and the STC. The time comparison unit 162 obtains the threshold from the threshold storage unit 161, and determines whether the calculated difference is equal to or larger than the threshold. For example, if the calculated difference is smaller than the obtained threshold at the time, the comparison process performed by the time comparison unit 162 is terminated.

Next, when the DTS extracted by the DTS extraction unit 140 is output to the time comparison unit 162 (402), the time comparison unit 162 obtains the STC from the system time generation unit 180 at a time point B shown in FIG. 6 (405). The time comparison unit 162 then calculates the difference between the DTS and the STC, and determines whether the calculated difference is equal to or larger than the threshold. For example, if the calculated difference is equal to or larger than the obtained threshold at the time, the time comparison unit 162 outputs the determination result to the DTS monitoring control unit 163 (406). Upon receipt of the determination result, the DTS monitoring control unit 163 outputs the operation stop command to stop reading the PS from the stream buffer 110 to the demultiplexer 120 (408). Upon receipt of the operation stop command, the demultiplexer 120 stops the operation of reading the PS from the stream buffer 110.

Next, after a predetermined time (between the time point B and a time point C shown in FIG. 6 in this example), the time comparison unit 162 obtains the STC from the system time generation unit 180 at the time point C shown in FIG. 6 (406).

The time comparison unit 162 then calculates the difference between the DTS obtained at the time point B shown in FIG. 6 and the STC obtained at the time point C shown in FIG. 6, and determines whether the calculated difference is equal to or larger than the obtained threshold. For example, if the calculated difference is smaller than the obtained threshold, the time comparison unit 162 outputs the determination result to the DTS monitoring control unit 163 (407). Upon receipt of the determination result, the DTS monitoring control unit 163 outputs the operation start command to resume an operation of reading the PS from the stream buffer 110 to the demultiplexer 120 (409). Upon receipt of the operation start command, the demultiplexer 120 resumes the operation of reading the PS from the stream buffer 110.

[Relativity Between DTS and SIC]

Figure 7:
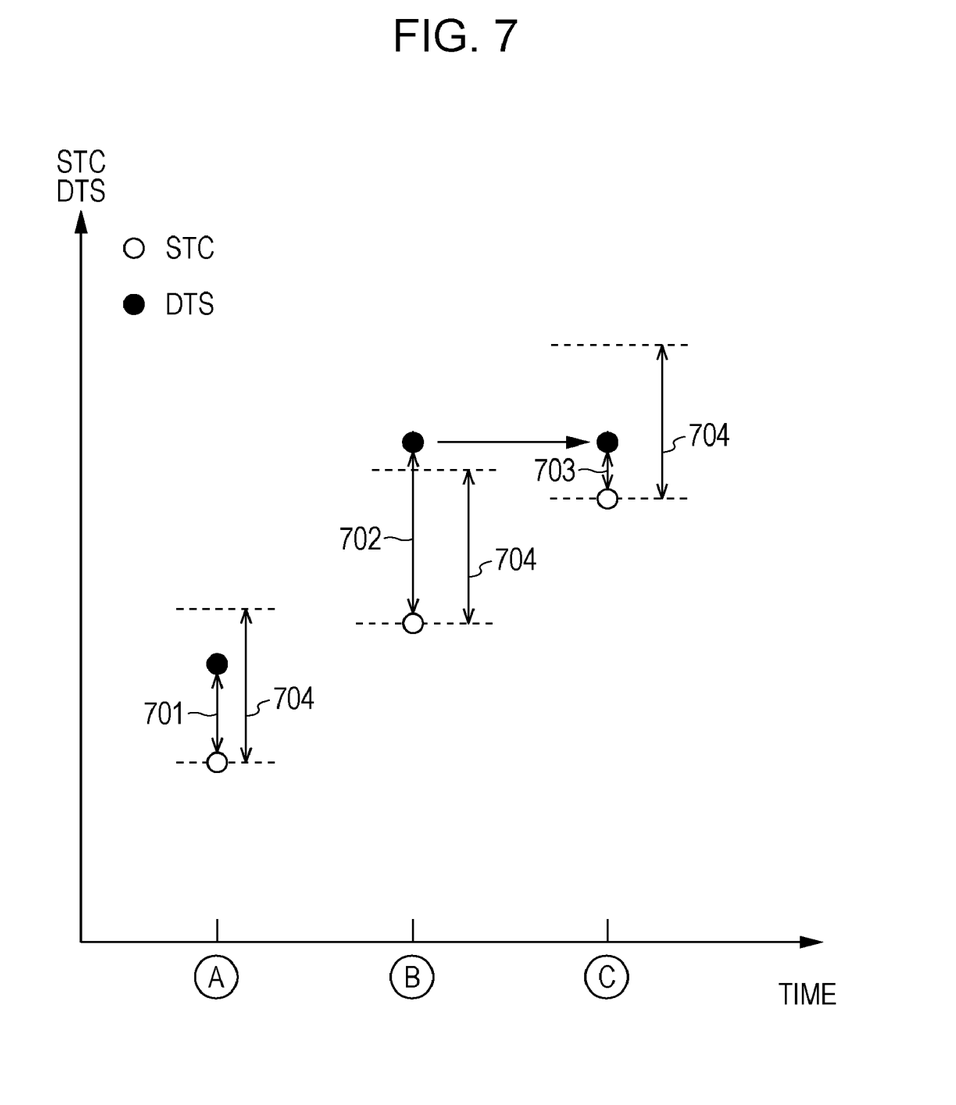
FIG. 7 illustrates relativity between a DTS and a system time clock (STC) compared by a time comparison unit according to the embodiment of the present invention.

FIG. 7 illustrates the relativity between the DTS and the STC compared by the time comparison unit 162 according to the embodiment of the present invention. In FIG. 7, the horizontal axis shows the time, and the vertical axis shows the value indicated by the DTS or the STC. The letters A, B, and C shown in FIG. 7 correspond to time points indicated by A, B, and C shown in FIG. 6, respectively.

In FIG. 7, a white dot indicates the STC obtained by the time comparison unit 162 at the time point A, B, or C. Similarly, a black dot indicates the DTS obtained by the time comparison unit 162 at the time point A, B, or C. Differences 701, 702, and 703 are values calculated by the time comparison unit 162 at the time point A, B, and C, respectively. A threshold 704 is stored in the threshold storage unit 161, and it is used for the comparison process performed by the time comparison unit 162. Each difference indicates that the PES from which the DTS was extracted is to be decoded after the time period indicated by the difference counted from the STC that serves as the present time.

For example, in the case of the time point A shown in FIG. 7, counted from the STC obtained by the time comparison unit 162 at this time point, the PES from which the DTS was extracted is decoded by the decoder 804 after the time period indicated by the difference 701. In this case, because the difference 701 calculated by the time comparison unit 162 is smaller than the threshold 704, the PES is output to the PES buffer 150.

Next, in the case of the time point B shown in FIG. 7, because the difference 702 is larger than the threshold 704, the PES from which the DTS was extracted is to be decoded after the time period indicated by the threshold 704 counted from the STC obtained by the time comparison unit 162 at this time point. Therefore, the DTS monitoring unit 160 stops the operation of the demultiplexer 120. The PES from which the DTS was extracted is stored in the PES storage unit 130 so as not to be input to the PES buffer 150.

Next, in the case of the time point C shown in FIG. 7, because the time advanced from B to C, the difference 703 became smaller than the threshold 704. Therefore, the DTS monitoring unit 160 makes the demultiplexer 120 resume its operation to output the PES to the PES buffer 150.

As described above, the time comparison unit 162 determines whether the difference between the DTS indicative of the decoding time of the PES and the STC indicative of the present time is within the threshold indicative of the predetermined time period. When the difference between the DTS and the STC is equal to or larger than the threshold, the time comparison unit 162 stops the demultiplex performed by the demultiplexer 120 to stop the output to the PES buffer 150. In this manner, the PES buffer 150 can store only the PES to be decoded when the predetermine time has passed since the present time.

[Example of Demultiplex Process Control Performed by the Buffer Availability Monitoring Unit]

Figure 8:
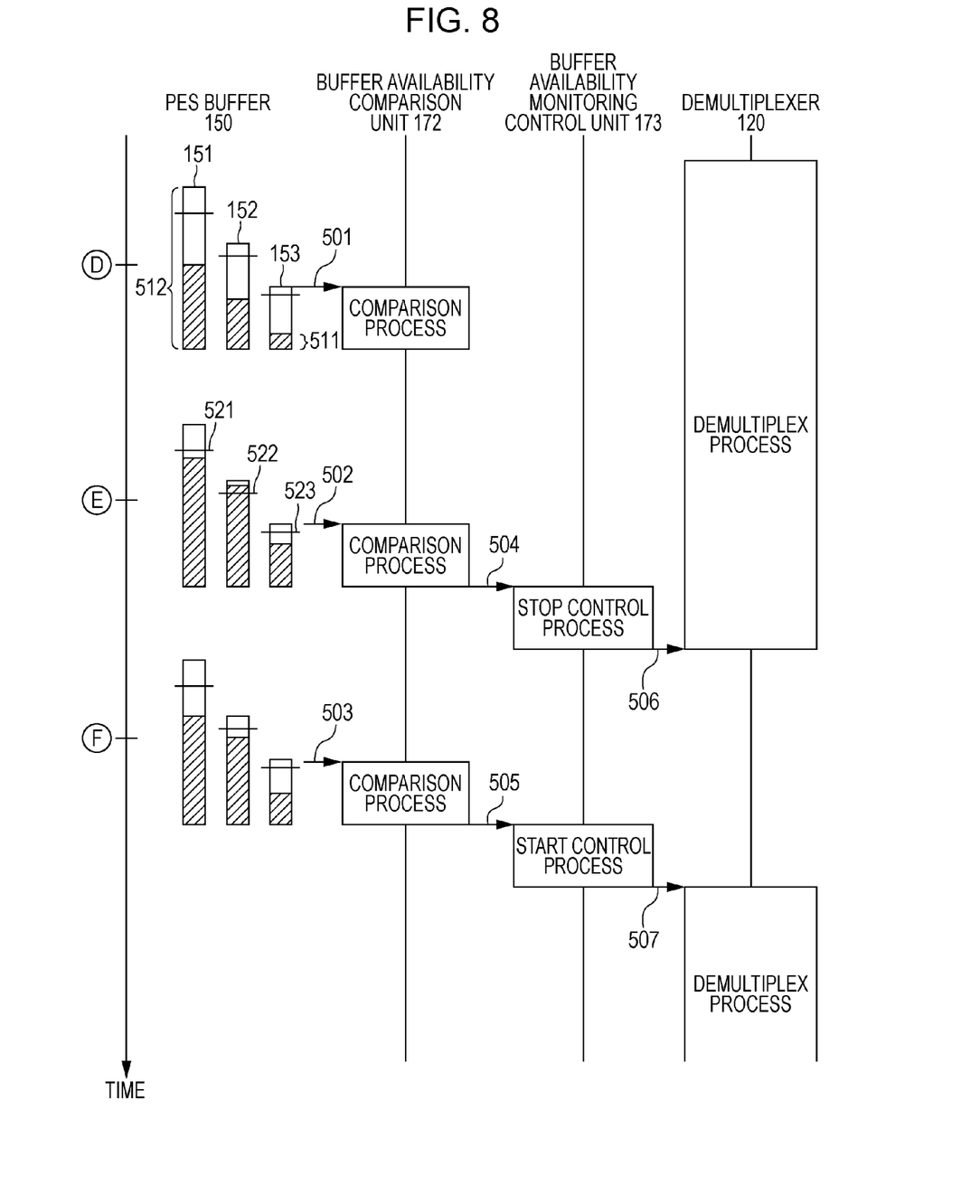
FIG. 8 is a sequence diagram for illustrating an example of the demultiplex process control performed by a buffer availability monitoring unit according to the embodiment of the present invention.

FIG. 8 is a sequence diagram for illustrating an example of the demultiplex process control performed by the buffer availability monitoring unit 170 according to the embodiment of the present invention.

FIG. 8 visually shows the video PES buffer 151, the audio PES buffer 152, and the caption PES buffer 153 included in the PES buffer 150. That is, a capacity of each PES buffer is expressed as a rectangle. An amount of PES data stored in each PES buffer at each time point D, E, and F is expressed as a shadowed rectangle. For example, a capacity 512 indicates the capacity of the video PES buffer 151. A data amount 511 indicates an amount of the PES data stored in the caption PES buffer 153 at the time point D. Thresholds 521, 522, and 523 are stored in the threshold storage unit 171, which are set for respective PES buffers.

The buffer availability comparison unit 172 obtains amounts of the PES data from the PES buffer 150 at a predetermined interval. For example, at the time point D, the buffer availability comparison unit 172 obtains the amount of the video PES data, the amount of the audio PES data, and the amount of the caption PES data from the PES buffer 150 (501). The buffer availability comparison unit 172 then obtains thresholds set for each PES buffer from the threshold storage unit 171. The buffer availability comparison unit 172 compares each obtained threshold with the data amount in the corresponding PES buffer, and determines whether the data amount in each PES buffer is larger than the corresponding threshold. At the time point D, there is no data amount in any PES buffer that is larger than the corresponding threshold, and the comparison process is terminated.

Next, the buffer availability comparison unit 172 obtains the amounts of the PES data from the PES buffer 150 at the time point E (502). The buffer availability comparison unit 172 then compares each obtained threshold with the data amount in the corresponding PES buffer, and determines whether the data amount in each PES buffer is larger than the corresponding threshold. At this time, because the data amount in the audio PES buffer is larger than the threshold set for the audio PES buffer as shown in FIG. 7, the buffer availability comparison unit 172 outputs the determination result to the buffer availability monitoring control unit 173 (504). Upon receipt of the determination result, the buffer availability monitoring control unit 173 outputs an operation stop command to stop reading the PS from the stream buffer 110 to the demultiplexer 120 (506). Upon receipt of the operation stop command, the demultiplexer 120 stops its operation of reading the PS from the stream buffer 110.

Next, the buffer availability comparison unit 172 obtains the amounts of the PES data from the PES buffer 150 at the time point E (503). The buffer availability comparison unit 172 then compares each obtained threshold with the data amount in the corresponding PES buffer, and determines whether the data amount in each PES buffer is larger than the corresponding threshold. At this time because there is no data amount in any PES buffer that is larger than the corresponding threshold as shown in FIG. 7, the buffer availability comparison unit 172 outputs the determination result to the buffer availability monitoring control unit 173 (505). Upon receipt of the determination result, the buffer availability monitoring control unit 173 outputs an operation start command to start reading the PS from the stream buffer 110 to the demultiplexer 120 (507). Upon receipt of the operation start command, the demultiplexer 120 resumes its operation of reading the PS from the stream buffer 110.

[Example of Operation of Record Reproduction Device]

An example of an operation of the record reproduction device 800 according to the embodiment of the present invention is described below.

Figure 9:
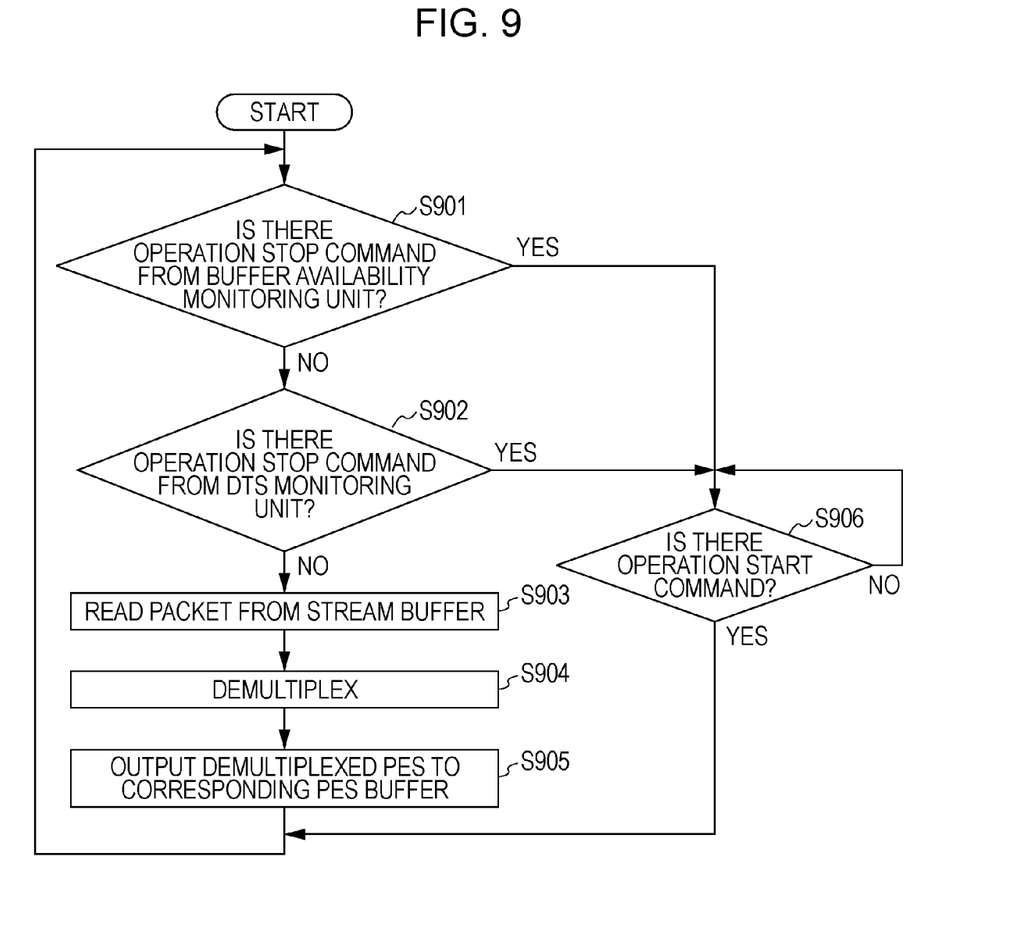
FIG. 9 is a flowchart of a demultiplex process performed by the demultiplexer according to the embodiment of the present invention.

FIG. 9 is a flowchart of a demultiplex process performed by the demultiplexer 120 according to the embodiment of the present invention.

First, the demultiplexer 120 determines whether there is an operation stop command output from the buffer availability monitoring unit 170 (Step S901). If there is no operation stop command (NO at Step S901), the demultiplexer 120 determines whether there is an operation stop command from the DTS monitoring unit 160 (Step S902). If there is any operation stop command at Step S901 or Step S902 (YES at Step S901 or Step S902), the demultiplexer 120 determines whether there is an operation start command (Step S906). The demultiplexer 120 repeats the determination of whether there is the operation start command until the operation start command is detected.

If there is no operation stop command from the DTS monitoring unit 160 (NO at Step S902), the demultiplexer 120 reads the PS from the stream buffer 110 (Step S903). The demultiplexer 120 then demultiplexes each PES from the multiplexed PS (Step S904). The demultiplexer 120 outputs the demultiplexed PES to the corresponding PES buffer 150 (Step S905). The demultiplex process returns to Step S901.

Figure 10:
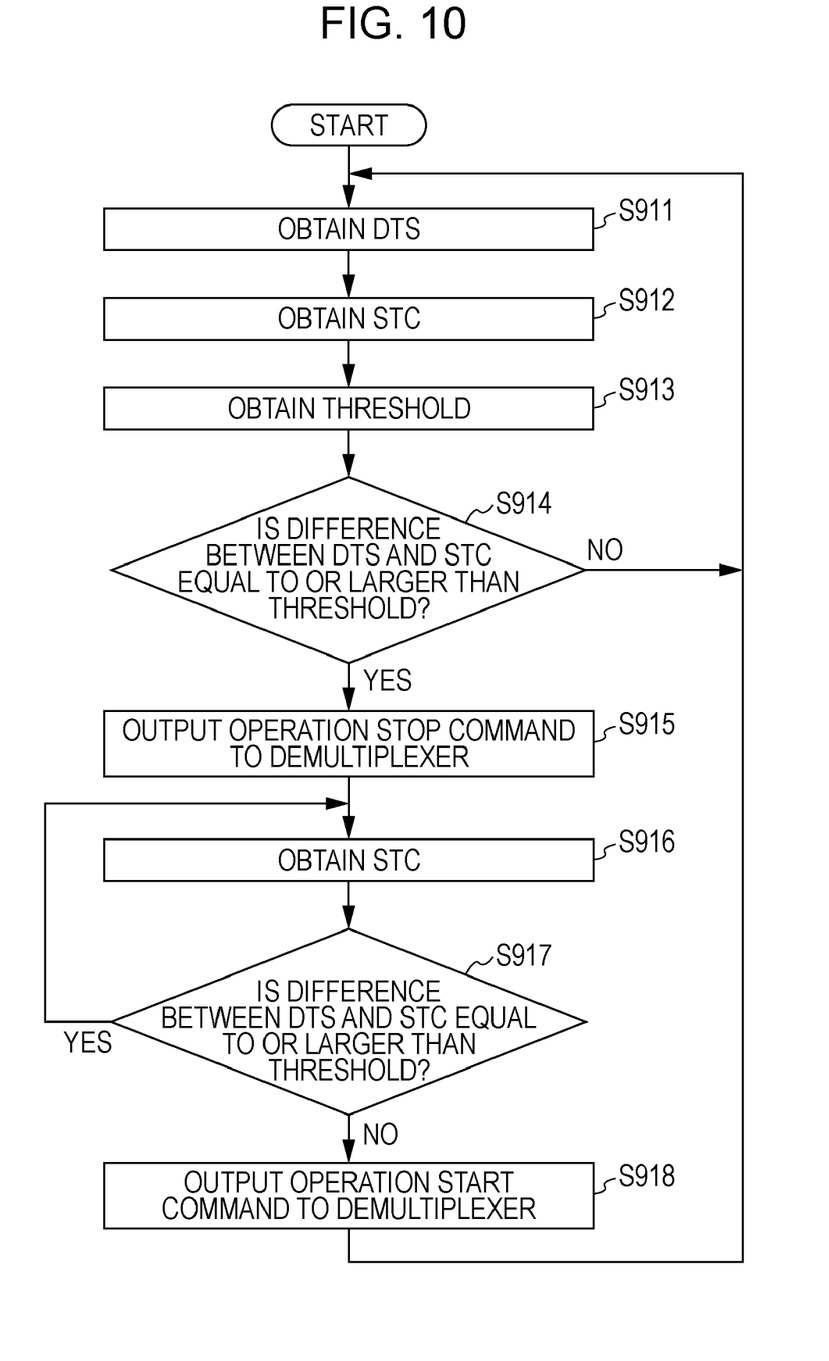
FIG. 10 is a flowchart of a monitoring process performed by the DTS monitoring unit according to the embodiment of the present invention.

FIG. 10 is a flowchart of a monitoring process performed by the DTS monitoring unit 160 according to the embodiment of the present invention.

First, the time comparison unit 162 obtains a DTS from the DTS extraction unit 140 (Step S911). The time comparison unit 162 then obtains an STC from the system time generation unit 180 (Step S912). The time comparison unit 162 obtains a threshold from the threshold storage unit 161 (Step S913).

The time comparison unit 162 calculates a difference between the obtained DTS and the obtained STC, and determines whether the difference is equal to or larger than the threshold (Step S914). Step S914 is an example of a determining step according to an embodiment of the present invention. If the calculated difference is not equal to or larger than the threshold (NO at Step S914), the process returns to Step S911. On the other hand, if the calculated difference is equal to or larger than the threshold (YES at Step S914), the DTS monitoring control unit 163 outputs an operation stop command to the demultiplexer 120 (Step S915). Step S915 is an example of a controlling step according to an embodiment of the present invention.

Next, the time comparison unit 162 obtains the STC from the system time generation unit 180 again (Step S916). The time comparison unit 162 calculates a difference between the already obtained DTS and the newly obtained STC, and determines whether the difference is equal to or larger than the threshold (Step S917). Step S917 is an example of the determining step according to an embodiment of the present invention. If the calculated difference is equal to or larger than the threshold (YES at Step S917), the time comparison unit 162 obtains the STC from the system time generation unit 180 again (Step S916), and repeats obtaining the STC until the difference becomes smaller than the threshold. On the other hand, if the calculated difference is not equal to or larger than the threshold (NO at Step S917), the DTS monitoring control unit 163 outputs the operation start command to the demultiplexer 120 (Step S918). The monitoring process then returns to Step S911. Step S918 is an example of the controlling process according to an embodiment of the present invention.

Figure 11:
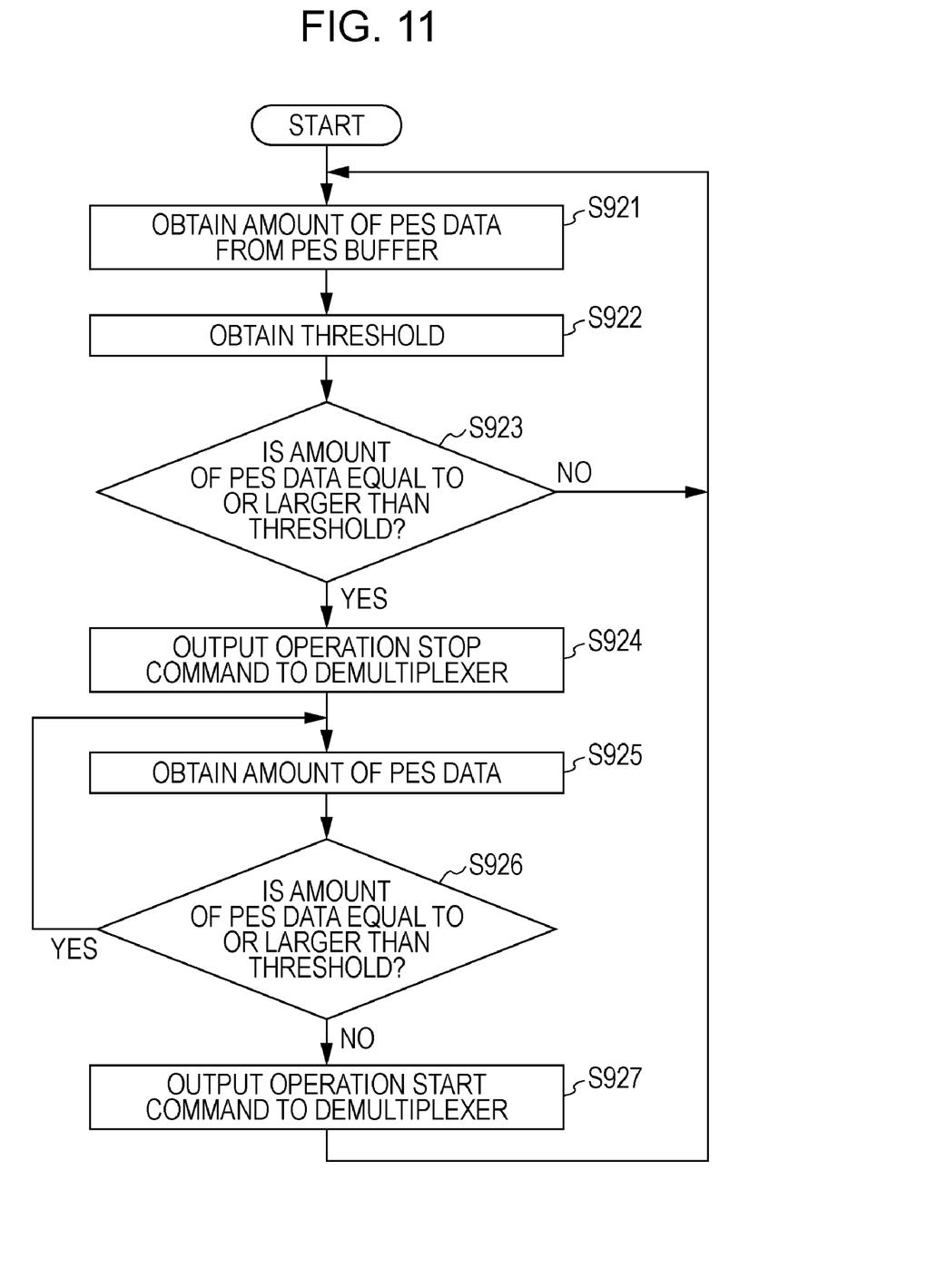
FIG. 11 is a flowchart of a monitoring process performed by the buffer availability monitoring unit according to the embodiment of the present invention.

FIG. 11 is a flowchart of a monitoring process performed by the buffer availability monitoring unit 170 according to the embodiment of the present invention.

First, the buffer availability comparison unit 172 obtains an amount of PES data from the PES buffer 150 (Step S921). The buffer availability comparison unit 172 then obtains a threshold from the threshold storage unit 171 (Step S922). The buffer availability comparison unit 172 then determines whether the amount of the PES data is equal to or larger than the threshold (Step S923). If the amount of the PES data is not equal to or larger than the threshold (NO at Step S923), the process returns to Step S921.

On the other hand, if the amount of the PES data is equal to or larger than the threshold (YES at Step S923), the buffer availability monitoring control unit 173 outputs an operation stop command to the demultiplexer 120 (Step S924). The buffer availability monitoring control unit 173 then obtains an amount of the PES data from the PES buffer 150 again (Step S925). The buffer availability monitoring control unit 173 then determines whether the amount of the PES data is equal to or larger than the threshold (Step S926). If the amount of the PES data is equal to or larger than the threshold (YES at Step S926), the process returns to Step S925. On the other hand, if the amount of the PES data is not equal to or larger than the threshold (NO at Step S926), the buffer availability monitoring control unit 173 outputs an operation start command to the demultiplexer 120 (Step S927). The monitoring process returns to Step S921.

As described above, according to an embodiment of the present invention, the DTS included in the PES is extracted from the PES demultiplexed by the demultiplexer 120. If the difference between the extracted DTS and the STC indicative of the present time is equal to or larger than the predetermined threshold, the demultiplexer 120 stops its operation so as not to output the PES indicative of the difference equal to or larger than the predetermined threshold to the PES buffer. In this manner, the PES buffer 150 stores only the PES to be decoded within the time period indicated by the predetermined threshold. As described above, for example, by limiting the audio PES stored in the PES buffer 150 to only the audio PES to be decoded within the predetermined time period, a silent period can be limited to a predetermined time period.

<2. Modifications>

A modification of the present invention is described below.

Although the above embodiment was described assuming the PS in the MPEG format as the data stream input to the data control unit 100, the present invention is not limited to this. Alternatively, for example, a TS in the MPEG format may be used as the data stream input to the data control unit 100. When the TS is used as the data stream input to the data control unit 100, the reference time is generated based on a program clock reference (PCR).

Although the DTS is extracted from the PES in the above embodiment, the PTS may be extracted from the PES so that a difference between the PTS and the STC is calculated. In this case, it is determined whether the difference between the PTS and the STC is equal to or larger than the threshold. When the PTS and the DTS included in the PES indicate the same time, the DTS may be omitted from the PES header. In such a case, only the PTS may be extracted.

The above embodiment was explained assuming a case in which the PS in the MPEG format read from the DVD or the TS in the MPEG format transmitted as a digital broadcasting is input to the data control unit 100. However, the present invention is not limited to this, and, for example, the record reproduction device 800 in the embodiment may further include a communication unit that receives the data stream from an external electronic device based on digital living network alliance (DLNA).

The threshold stored in the threshold storage unit 161 described in the above embodiment may be, for example, equal to one second. This value is adapted to a regulation to limit the time to store data in a buffer of a decoder up to one second as specified by the MPEG standard (ISO/IEC 13818-1). When the input video data is a still image, the upper limit to store the data in the buffer is 60 seconds, and therefore the time comparison unit 162 may be configured not to make the decision. When the input video format is advanced video coding (AVC, ISO/IEC 14496), the upper limit to store the data in the buffer is 10 seconds, and therefore the time comparison unit 162 may be configured not to make the decision.

The embodiment of the present invention described above only shows an example to realize the present invention, and covers constituents according to an embodiment of the present invention and relativities among them as described above. However, the present invention is not limited to the embodiment, but various modifications can be made within the scope of the present invention.

The processing procedures described in the embodiment may be regarded as a method including a series of the procedures, a program that causes a computer to execute the series of the procedures, and a recording medium that stores the program. The recording medium can be, for example, a compact disc (CD), a MiniDisc (MD), a DVD, a memory card, a Blu-ray Disc®, or the like.

The present application contains subject matter related to that disclosed in Japanese Priority Patent Application JP 2009-032129 filed in the Japan Patent Office on Feb. 16, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A buffer control device comprising:
a reference time generation unit configured to generate a reference time based at least in part on time information included in a data stream input;
a buffer configured to receive an encoded data extracted from the data stream, store the encoded data, and output the encoded data at a decoding time or a reproducing time of the encoded data, the encoded data comprising a plurality of encoded data types, the plurality of encoded data types comprising video data, audio data in a first form, and audio data in a second form;
a control unit configured to control an input of the encoded data to the buffer based at least in part on a relativity between the decoding time or the reproducing time of the encoded data and the reference time; and
wherein the control unit is configured to calculate a difference between the decoding time or the reproducing time of the encoded data and the reference time, and stop the input of one of the plurality of encoded data types to the buffer when the difference is larger than a predetermined threshold for the one encoded data type.

2. The buffer control device according to claim 1, wherein the control unit is configured to obtain the reference time from the reference time generation unit at a predetermined time interval after stopping the input to the buffer, and resume the input to the buffer when the difference between the reference time and the decoding time or the reproducing time is equal to or smaller than the predetermined threshold.

3. The buffer control device according to claim 1, wherein the control unit is configured to obtain an amount of the encoded data stored in the buffer, and stop the input to the buffer when the amount is larger than a predetermined amount.

4. The buffer control device according to claim 3, wherein the control unit is configured to obtain the amount of the encoded data stored in the buffer again after stopping the input to the buffer, and resume the input to the buffer when the amount is equal to or smaller than the predetermined amount.

5. The buffer control device according to claim 1, wherein the encoded data is a data encoded in a MPEG format.

6. The buffer control device according to claim 1, wherein the decoding time is a decoding time stamp in the MPEG format, and the reproducing time is a presentation time stamp in the MPEG format.

7. The buffer control device according to claim 1, wherein the time information is either a program clock reference or a system clock reference in the MPEG format.

8. A buffer control method comprising the steps of:
determining a relativity between a decoding time or a reproducing time of an encoded data extracted from a data stream and input to a buffer configured to output the encoded data at the decoding time or the reproducing time and a reference time generated based at least in part on time information included in the data stream, the encoded data comprising a plurality of encoded data types, the plurality of encoded data types comprising video data, audio data in a first form, and audio data in a second form; and
controlling an input of the encoded data to the buffer based on a determination result made at the determining step, the controlling comprising calculating a difference between the decoding time or the reproducing time of the encoded data and the reference time, and stopping the input of one of the plurality of encoded data types to the buffer when the difference is larger than a predetermined threshold for the one encoded data type.

9. A non-transitory computer readable medium on which is stored a program that causes a computer to execute the steps of:
determining a relativity between a decoding time or a reproducing time of an encoded data extracted from a data stream and input to a buffer configured to output the encoded data at the decoding time or the reproducing time and a reference time generated based at least in part on time information included in the data stream, the encoded data comprising a plurality of encoded data types, the plurality of encoded data types comprising video data, audio data in a first form, and audio data in a second form; and
controlling an input of the encoded data to the buffer based at least in part on a determination result made at the determining step, the controlling comprising calculating a difference between the decoding time or the reproducing time of the encoded data and the reference time, and stopping the input of one of the plurality of encoded data types to the buffer when the difference is larger than a predetermined threshold for the one encoded data type.

* * * * *